(12) United States Patent
Sundaresan et al.

(10) Patent No.: US 12,000,945 B2
(45) Date of Patent: Jun. 4, 2024

(54) VISUAL AND RF SENSOR FUSION FOR MULTI-AGENT TRACKING

(71) Applicant: NEC Laboratories America, Inc., Princeton, NJ (US)

(72) Inventors: Karthikeyan Sundaresan, Manalapan, NJ (US); Ramanujan Sheshadri, Jersey City, NJ (US); Mallesham Dasari, Stony Brook, NY (US)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 17/825,687

(22) Filed: May 26, 2022

(65) Prior Publication Data

US 2022/0381870 A1  Dec. 1, 2022

Related U.S. Application Data

(60) Provisional application No. 63/196,387, filed on Jun. 3, 2021, provisional application No. 63/194,262, filed on May 28, 2021.

(51) Int. Cl.
*G01S 5/02* (2010.01)
*G01S 5/00* (2006.01)

(52) U.S. Cl.
CPC ............. *G01S 5/0264* (2020.05); *G01S 5/011* (2020.05)

(58) Field of Classification Search
CPC ................................ G01S 5/0264; G01S 5/011
USPC ........................................................ 342/451
See application file for complete search history.

(56) References Cited

U.S. PATENT DOCUMENTS

| | | | |
|---|---|---|---|
| 10,514,437 B2 * | 12/2019 | Pajovic | G01S 5/0252 |
| 2019/0202067 A1 | 7/2019 | Xiong et al. | |
| 2020/0206921 A1 | 7/2020 | Xiong et al. | |
| 2021/0084217 A1 * | 3/2021 | Kleinbeck | G01S 5/02585 |

FOREIGN PATENT DOCUMENTS

| | | | | |
|---|---|---|---|---|
| CN | 113392883 A | * | 9/2021 | |
| WO | WO-2006012645 A2 | * | 2/2006 | G01S 3/7864 |
| WO | WO-2019184542 A1 | * | 10/2019 | G01C 11/04 |
| WO | WO-2020052990 A1 | * | 3/2020 | G01S 1/042 |

OTHER PUBLICATIONS

Cheung et al., "A constrained least squares approach to mobile positioning: algorithms and optimality", EURASIP Journal on Advances in Signal Processing 2006, Dec. 2006, pp. 1-23.

Hua et al., "Geometrical constrained least squares estimation in wireless location systems", In 2014 4th IEEE International Conference on Network Infrastructure and Digital Content, Sep. 19, 2014, pp. 159-163.

(Continued)

*Primary Examiner* — Harry K Liu
(74) *Attorney, Agent, or Firm* — Joseph Kolodka

(57) ABSTRACT

Methods and systems for determining a device position include determining a first position estimate using radio-based range information. A second position estimate is determined using visual odometry information. The first position estimate and the second position estimate are fused based on radio environmental conditions and visual environmental conditions to determine a final position estimate. Resources are deployed based on the final position estimate.

19 Claims, 10 Drawing Sheets

(56) References Cited

OTHER PUBLICATIONS

Ayyalasomayajula et al., "Deep learning based wireless localization for indoor navigation", In Proceedings of the 26th Annual International Conference on Mobile Computing and Networking, Apr. 16, 2020, pp. 1-14.
Jung et al., "UbiTrack: Infrared-based user Tracking System for indoor environment", International Conferece on Artificial Reality and Telexisitence (ICAT04), Dec. 2004, pp. 1345-1278.
Kumar et al., "Improving person tracking using an inexpensive thermal infrared sensor", In Proceedings of the IEEE Conference on Computer Vision and Pattern Recognition Workshops 2014, pp. 217-224.
Luo et al., "Indoor positioning systems based on visible light communication: State of the art." IEEE Communications Surveys & Tutorials 19, Aug. 23, 2017, pp. 2871-2893.
Constandache et al., "Daredevil: indoor location using sound", ACM SIGMOBILE Mobile Computing and Communications Review 18, Jun. 2014, pp. 9-19.
Löllmann et al., "The LOCATA challenge data corpus for acoustic source localization and tracking", In 2018 IEEE 10th Sensor Array and Multichannel Signal Processing Workshop (SAM). IEEE, Jul. 8, 2018, pp. 410-414.
Peng et al., "BeepBeep: A High Accuracy Acoustic Ranging System Using COTS Mobile Devices", In Proceedings of the 5th International Conference on Embedded Networked Sensor Systems (SenSys '07). Association for Computing Machinery, New York, NY, USA, https://doi.org/10.1145/1322263.1322265, Nov. 6, 2007, pp. 1-14.

* cited by examiner

VISUAL AND RF SENSOR FUSION FOR MULTI-AGENT TRACKING

RELATED APPLICATION INFORMATION

This application claims priority to U.S. Patent Application No. 63/196,387, filed on Jun. 3, 2021, and to U.S. Patent Application No. 63/194,262, filed on May 28, 2021, incorporated herein by reference in its entirety.

BACKGROUND

Technical Field

The present invention relates to localization and tracking, and more particularly to localizing a device using multiple sources of data.

Description of the Related Art

The ability to localize and track both people and assets in real-time, particularly in environments where global positioning satellite (GPS) signals are not available, is useful for a variety of different applications. For example, such localization may be used to facilitate collaborative tasks between humans and robots.

SUMMARY

A method for determining a device position includes determining a first position estimate using radio-based range information. A second position estimate is determined using visual odometry information. The first position estimate and the second position estimate are fused based on radio environmental conditions and visual environmental conditions to determine a final position estimate. Resources are deployed based on the final position estimate.

A system for determining a device position includes a hardware processor and a memory. The memory stores a computer program which, when executed by the hardware processor, causes the hardware processor to determine a first position estimate using radio-based range information, to determine a second position estimate using visual odometry information, to fuse the first position estimate and the second position estimate based on radio environmental conditions and visual environmental conditions to determine a final position estimate, and to deploy resources based on the final position estimate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
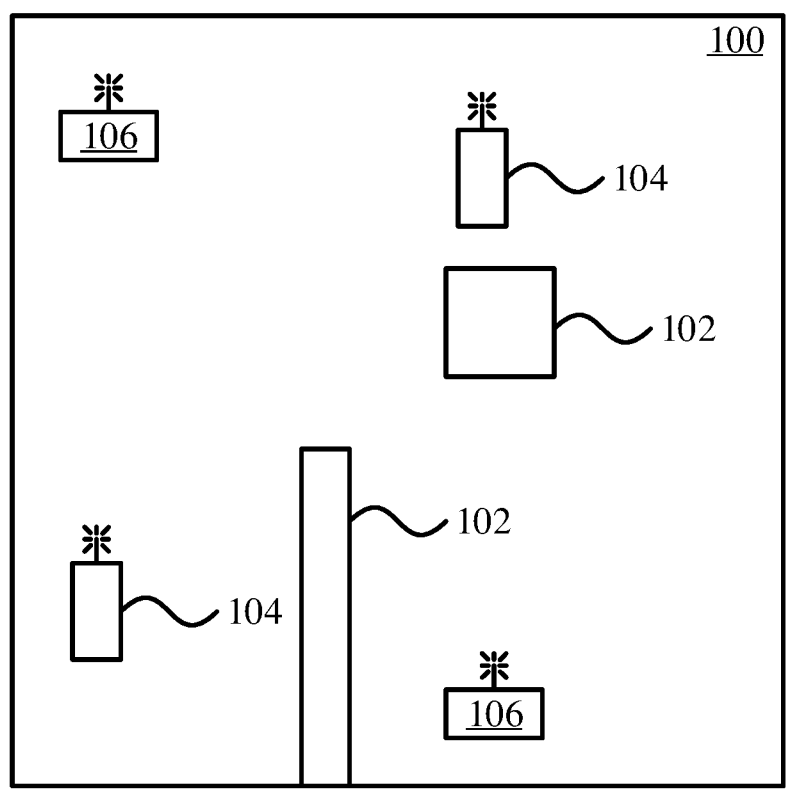
FIG. 1 is a diagram of an interior environment, including agent devices and anchor nodes, where device locations may be determined, in accordance with an embodiment of the present invention.

Dual layer diversity may be used to improve the localization of multiple agents in a space. For example, fusing complementary tracking modalities, such as passive/relative modalities (e.g., visual odometry) and active/absolute modalities (e.g., infrastructure-assisted radio localization). To deliver robustness in unfamiliar environments, without sacrificing tracking accuracy, diversity in methodology is also employed, bringing together the complementary strengths of algorithmic and data-driven approaches. Thus, for example, the complementary benefits of radio location sensing and visual tracking may be combined to track agents with algorithmic and data-driven techniques that share the burden of maintaining accuracy.

Passive tracking may include odometry-based techniques, such as visual inertial odometry, which combines visual information from cameras and motion information from inertial sensors. Passive tracking can provide position information to within tens of centimeters under favorable visual conditions, but are vulnerable to common environmental conditions, such as dim lighting and textureless surfaces. Furthermore, passive tracking provides relative position information, which makes it difficult for them to recover from unfavorable events, while also limiting their ability to provide localization within a global frame of reference.

Active tracking may include the use of fixed anchor nodes, which provide absolute localization within a frame of reference that is defined by the known positions of the anchor nodes. The use of anchor tracking eliminates the errors that can accumulate using passive tracking. However, active systems have a tradeoff in their operational range and accuracy. While high-resolution active tracking systems, such as infrared, millimeter wave, and acoustic systems, provide good accuracy, they are restricted in range to line-of-sight applications. Low-resolution active tracking systems, such as those using common wireless networking technologies, can handle non-line-of-sight positioning and have longer operational ranges, but have reduced tracking accuracy relative to the high-resolution systems.

A hybrid approach that uses both passive and active systems enables scalable and accurate multi-agent tracking. Thus, a tracking device may include both passive tracking devices, such as a stereo camera, and a radio interface. While the camera provides visual odometry-based relative tracking, the radio interface provides absolute tracking by estimating the ranges and positions of one or more anchor nodes in the environment.

Algorithmic solutions can estimate the absolute location from radio information and to estimate relative translation information from visual data, while data-driven models can provide data filtering, feature composition, and the fusion of the different data modalities. Data filtering helps to isolate radio ranging estimates that are impacted by non-line-of-sight propagation, which would otherwise degrade accuracy, while feature composition estimates the certainty of the absolute and relative position information, by accounting for their environmental and sensor artifacts. Fusion jointly considers the sensor streams and automatically attends to the appropriate sensor estimates based on their features and relative importance at any given time to provide robustness and to maintain high tracking accuracy. The fusion model need not capture the complex problem structure purely from data, and can instead rely on the physics and geometry involved in the respective localization modalities. This reduces the latency and computational needs for real-time operation on resource-constrained devices.

This combined approach provides superior accuracy across diverse environments. For example, in some tests of the hybrid approach, tracking accuracy to within about 15 cm was achieved, contrasted to equivalent tests of radio-based and visual tracking along, which produced accuracies of about 40 cm and about 32 cm, respectively. The combination of algorithmic and data-driven approaches similarly provided benefits in previously unseen environments, giving tracking accuracies of about 30 cm were achieved, contrasted to accuracies of about 60 cm and about 80 cm provided by algorithmic and data-driven approaches alone.

Referring now to FIG. 1, an exemplary multi-agent tracking environment 100 is shown. The environment 100 includes obstacles 102 and multiple agents 104 that can move freely around the obstacles. The obstacles 102 may include, for example, walls, furniture, doors, and any other physical object that may impact the agents' freedom of motion and/or the propagation of radio signals. For example, a window may prevent a user's passage, but may nonetheless allow radio signals to propagate freely.

Also shown are anchor nodes 106. The anchor nodes 106 provide radio ranging and positioning information for the agents 104. The ranging and positioning information may include, for example, a signal strength or time of flight that indicates a distance between an anchor node 106 and an agent 104, and may furthermore include directional information that indicates an angle at which signals are received at the agent 104 from the anchor node 106.

The anchor nodes 106 and agents 104 may use any appropriate radio localization technology. Exemplary technologies include WIFI® and ultrawide band (UWB) radio. These technologies offer a good balance between tracking resolution and non-line-of-sight operation, but other technologies are also contemplated, such as millimeter wave technologies.

During radio-based localization, the distance between an agent 104 and an anchor node is estimated using radio ranging. Estimated distances to three anchors 106, or to a single anchor 106 with multiple antennas, can provide directional information. Combining the estimated distance and direction with a known position of the anchor(s) 106 provides an absolute location within the environment 100. The accuracy of the location estimate will depend on the accuracy of the individual distance and angle estimates. Combining UWB's two-way ranging with its large bandwidth provides robustness to indoor multipath and high ranging accuracies, for example on the order of tens of centimeters.

Visual odometry uses a stream of camera images to track motion of the agent 104. Changes in texture, color, and shape in successive camera images of a static environment are used to track motion with high precision, for example on the order of centimeters. However, in environments with poor lighting or with few textures, or conditions that include perceptual aliasing, accuracy of visual odometry suffers. Inertial odometry can therefore be used to improve tracking accuracy from visual sources.

Although visual odometry provides highly accurate relative localization, it can accumulate errors over time. Once an error occurs, relative measurements of visual odometry can propagate that error forward in time, resulting in significant drifts in the estimated positions. Radio-based active tracking is immune to such drift, as each location estimation is independent of earlier estimates. Thus, errors that occur due to incorrect ranging estimates do not propagate, allowing UWB to provide improved accuracy in absolute tracking over periods of time.

Because radio-based position estimates provide coarser resolutions than visual odometry-based estimates, fusion between the two types of sensor information brings the complementary benefits of each, so that the radio-based estimates are used to eliminate errors in the otherwise more precise visual odometry measurements.

Accurate multi-agent tracking may be used in a variety of different applications. For example, augmented reality and virtual reality gaming and collaborative environments are becoming more popular as their associated technologies improve. Tracking users with respect to one another in such a virtual or augmented environment makes it possible to track their physical relationships and to provide functionality that is sensitive to their positions. For example, recognizing that two users are near to one another in space makes it possible to provide augmented reality functioning that allows interaction within the virtual environment.

Tracking can furthermore be used in situations where accurate real-time location data is used to help navigate through an interior space. In an emergency, for example during a fire, visibility may be obscured by smoke and debris. Agent tracking may be used to identify the positions of emergency service personnel, as well as building inhabitants, to make search and rescue easier.

Fusion of visual/inertial and radio-based data makes it possible to connect the high-resolution relative positioning estimates from visual odometry to a global reference frame. Measuring positions relative to known anchor locations makes it possible to localize agents within a known space, for example by connecting their coordinates with positions on a map.

When fusing different methodologies, a variety of algorithm-driven and data-driven models may be considered. Algorithmic solutions include filter-based data-fusion, such as Kalman filters and Bayesian filters, which aim to minimize statistical noise using time series data from individual sensors. Data-driven solutions, including black-box systems, may focus on passive tracking. Black box models may be trained to interpret and transform input sequences of raw sensor data into relative locations or pose estimates. Using these solutions to fuse radio-based range estimates and visual odometry camera images, to predict absolute position estimates, may be challenging to implement in a single model. Such a model may end up being too reliant on the input data distribution, providing poor results in unfamiliar environments. However, combining these two methodological approaches can help to avoid the pitfalls of each, with algorithmic models providing robustness in untrained environments and with data-driven models providing high accuracy through sensor fusion.

Figure 2:
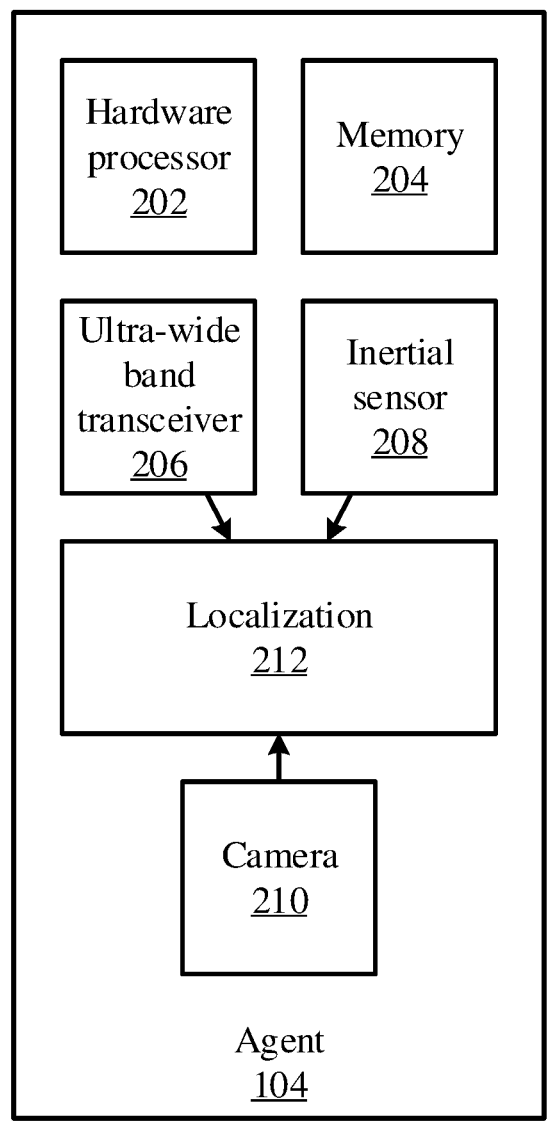
FIG. 2 is a block diagram of an agent device that includes radio and visual sensor components that can be used to provide respective location estimates that are fused to localize the agent device, in accordance with an embodiment of the present invention.

Referring now to FIG. 2, a block diagram of one of the agent devices 104 is shown. The agent device 104 may be any appropriate mobile device, such as a mobile phone, headset, or autonomous unit (e.g., a robot). The agent 104 may include a hardware processor and memory 204, as well as any appropriate software that is needed to operate the device. The agent 104 may include an ultra-wide band transceiver 206 that is configured to communicate with the anchor node 106 in an environment 100, as well as with other agent devices 104 on the floor in the environment 100.

Although UWB communications are specifically contemplated, it should be understood that other radio frequency technologies may be used instead. As used herein, UWB may refer to signals at frequencies between 3 and 6 GHz with a relatively wide bandwidth. It is also contemplated that millimeter wave radio frequencies can be used, such as in the range between 24 GHz and 30 GHz or the range between 57 GHz and 66 GHz), or WIFI® signals at about 2.4 GHz and 5 GHz, but UWB signals strike a good balance between spatial resolution and the ability to localize non-line-of-sight objects.

An inertial sensor 208 and a camera 210 may be used to provide visual/inertial odometry information. The camera may be a mono or stereo camera, or may provide additional views, providing any appropriate number of video streams. The inertial sensor 208 may include an accelerometer that can capture six degrees of freedom, providing information on how the device moves through space. Localization 212 synthesizes all of this information. For visual/inertial odometry, localization 212 combines visual information that indicates the motion of the agent 104 with directly measured acceleration information to estimate how the agent 104 moves through space. Localization 212 can select between the visual/inertial odometry estimates and estimates generated from the UWB transceiver by determining which is more appropriate for a given environment and conditions.

In the case of UWB, time of flight may be used to measure the distance $R_i$ to a known anchor node i. Range estimations may be made between the device 104 and multiple known anchor nodes 106 (e.g., at least three), or a single anchor node 106 if angular information is available (e.g., from multiple antennas). Multi-lateration may be used, based on known positions of the anchor nodes 106, to solve for the absolute location estimate of the agent 104. If there are n anchor nodes 106, each with a fixed position $(x_i, y_i)$, the absolute two-dimensional location of the device (x, y) can be estimated by minimizing the error $f_i = R_i - \sqrt{(x_i-x)^2+(y_i-y)^2}$ across the n anchor nodes 106. Any appropriate optimization may be used to solve the multi-lateration problem, such as a least squares approach.

Components that impact localization accuracy may include multi-lateration optimization error and environmental conditions. These may manifest as inaccurate range estimates. Multi-lateration optimization errors can be estimated as an output of the optimization solution, but errors due to environmental conditions can be more difficult to quantify. Additionally, errors resulting from variance in radio-based ranging can have a large impact on localization accuracy.

When considering an indoor environment, with an exemplary five anchor nodes 106, the agent 104 may move in a trajectory within the environment that exposes both line-of-sight and non-line-of-sight paths to various anchors. Various scenarios may be considered, where different numbers of anchor nodes 106 are exposed to the agent 104 via line-of-sight paths, with the remainder being blocked in non-line-of-sight paths, for example by obstacles 102. Having line-of-sight paths to all available anchors 106 produces superior accuracy from radio-based localization as compared to scenarios where one or more anchors 106 is blocked in a non-line-of-sight path. In a mixed scenario, where some anchors may be in line-of-sight and some may be in non-line-of-sight to the agent 104, number of best anchor nodes 106 may be selected. While filtering out non-line-of-sight anchor nodes can reduce errors, determining the set of best anchors is not always simple without knowledge about the environmental conditions.

Non-line-of-sight range estimates can have low accuracy even for short distances. To identify the quality of an estimate, measurements of received signal power exhibit highly discriminative behavior. The received signal power can be estimated as:

$$P_{rx} = 10 \times \log_{10}\left(\frac{C \times 2^{17}}{N^2}\right) - AdBm$$

where C is the channel impulse response power, N is a preamble accumulation count to normalize the amplitude of channel impulse responses, and A is a constant that may be determined with the pulse repetition frequency. These constants may be specific to UWB radio ranging.

For example, as the distance along a non-line-of-sight path increases, received signal strength can vary by large amounts, while the signal strength may remain above a high threshold even after significant changes of position along a line-of-sight path. Thus, the received power $P_i$ between an anchor i and an agent 104, along with the range $R_i$, can serve as an effective discriminative feature to capture the impact of non-line-of-sight paths on the accuracy of the location estimate.

The extracted feature (P, R) helps to identify accurate range estimates when a sufficient number of anchors (e.g., three or more) are available and to indirectly capture the certainty of a location estimate for subsequent fusion.

The number of anchor nodes 106 visible to a given agent 104 may be relatively small. Machine learning models, such as support vector machines or logistic regression, may be used to select the best anchors. A separate anchor classification dataset may be derived from collected data to train a classifier that selects the best K anchors for localization. A model may be fit with the ranges from all anchors 106, along with their corresponding received powers, as input. The best anchor set, providing the minimum error compared to a known ground truth, may be set as a binary output vector.

Multi-output classification using classifier chains exploits the correlation among the anchors 106. Multiple different models (e.g., support vector machine, logistic regression, and random forests) may be optimized using a grid search to tune their parameters. After the grid search, a best performing model may be selected. The model helps to filter inputs, while the multi-lateration is responsible for estimating the location estimate.

While anchor selection filters non-line-of-sight anchors to improve the location estimate, device may not have access to three usable line-of-sight anchors, resulting in poor localization accuracy. The signal strength information along and the ranges may be combined with absolute location estimates from the multi-lateration to form a composed radio-based input to the sensor fusion. Thus, the input from the radio-based path to localization 212 may be expressed as $<X_u \oplus P_i R_i>$, $<Y_u \oplus P_i | R_i>$, where $\oplus$ is a concatenation operation, concatenating location estimates with the device's range and received power to each anchor.

Visual odometry may perform tracking, local mapping, pose optimization, and loop closing. Tracking using a stream of image frames (e.g., stereo camera images) to incrementally and relatively localize the device on a frame-by-frame basis. This may be performed by extracting features from images and establishing matching keypoint correspondences between the frames. At a given time instance t, features are extracted from two or more stereo frames $V_t^s$, reprojected onto real world coordinates to estimate the depth of each feature. This makes it possible to estimate the scale of tracking.

Final features may be counted by matching features across all stereo images. The matched features may be used to find correspondences with a previous reference frame (e.g., $V_{t-1}^s$) and to create a set of matching keypoints, which are then used to calculate the relative distance and heading estimates between the two frames, labeled as frame-to-frame alignment. These estimates are converted to relative displacements ($\Delta x_v$, $\Delta y_v$) to determine the current position ($x_v$, $y_v$).

Because visual odometry provides relative tracking, temporary environmental artifacts, such as limited visual features and dynamic scenes, that degrade a small number of displacement estimates, may result in a continuous accumulation of errors over time. Relative displacement in translation $r_v$ and heading $\theta_v$ may be used directly for sensor fusion, rather than using final relative estimates of position. Even when visual odometry generates temporary displacement errors, the resulting error propagation is only in displacement, as heading continues tracking the absolute trajectory direction. Thus, the error is only transient and does not propagate. Even the transient errors can be eliminated when the relative estimates ($r_v$, $\theta_v$) are fused with the radio-based absolute location estimates ($x_u$, $y_u$).

The relative estimates can themselves be erroneous, even in the absence of error drift. Short-term environmental artifacts, such as dynamic lighting occlusion, can introduce significant positional inaccuracies, even in visually feature-rich environments. To compensate, additional features may be used to capture the certainty of the tracking estimate.

The features extracted from images determine the tracking accuracy and robustness. The number of keypoints in an image may vary based on environmental factors, such as under different lighting conditions. Error rates are relatively consistent as long as the number of key points is above a threshold (e.g., about 500), but as the number of keypoints drops below the threshold, the error rate increases. When the number of keypoints is particularly low (e.g., below about 100), tracking may fail completely. Matching keypoints captures the certainty of the estimates delivered by tracking. This certainty-capturing feature M may be combined with the relative location estimates (r, $\theta$) generated by visual odometry to provide a composed odometry feature input to the sensor fusion. The input from the visual odometry path may be expressed as $<r \oplus M>$, $<\theta \oplus M>$.

Figure 3:
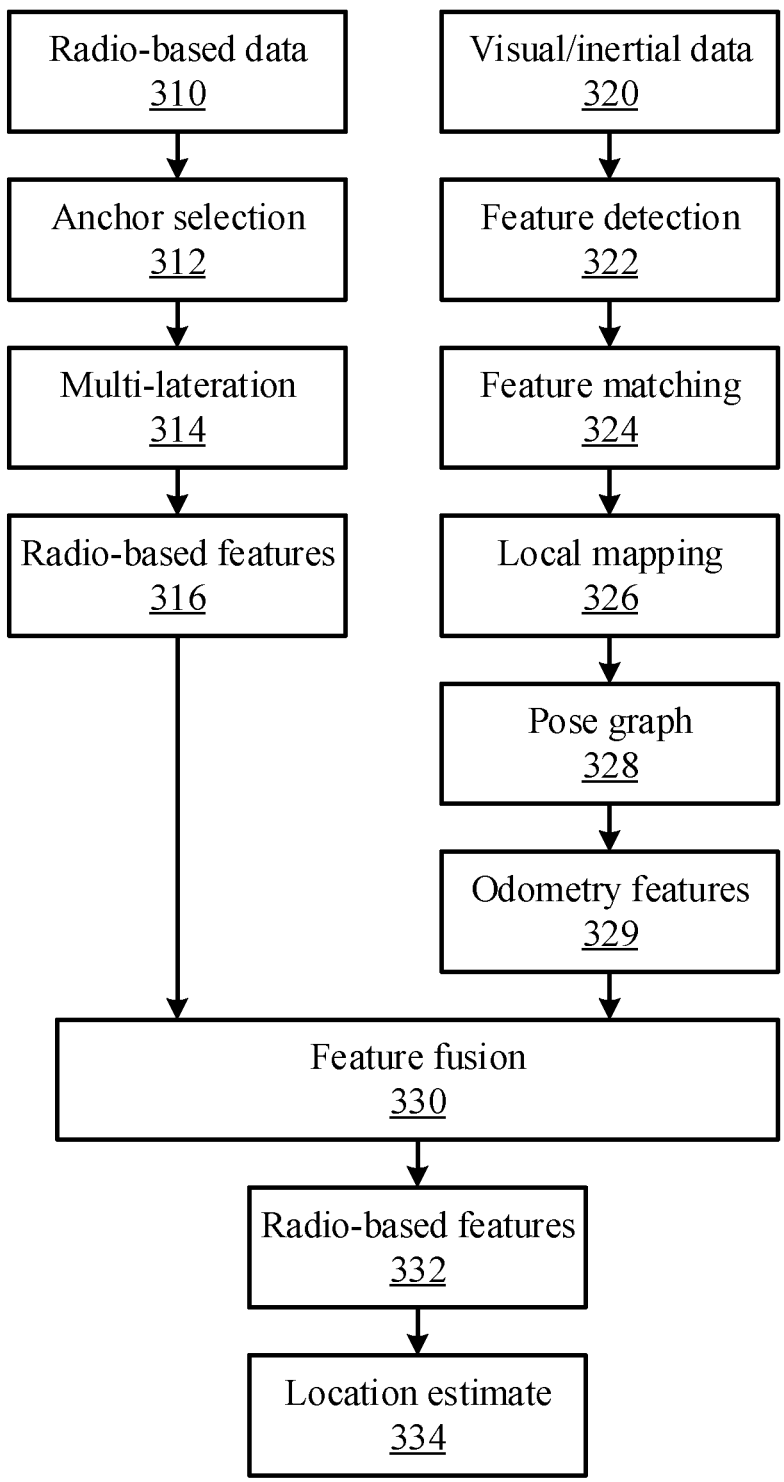
FIG. 3 is a block/flow diagram of a method of fusing location information based on independent types of sensor data to generate a location estimate for an agent device in accordance with an embodiment of the present invention.

Referring now to FIG. 3, an example of sensor fusion is shown. In a radio-based branch, radio data 310 is collected from the transceiver 206 of the agents 104 and potentially from the anchor nodes 106 as well. Block 312 performs anchor selection as described above, identifying a set of anchor nodes that provide the most reliable ranging and angle information. For example, this may be performed by observing signal strength, which may indicate whether an anchor has a line-of-sight path to the agent. Block 314 performs multi-lateration to generate radio-based location estimates. These estimates may be used to generate radio-based features 316.

In the odometry path, visual/inertial data 320 is used to generate a set of features. For example, visual simultaneous localization and mapping may be used for feature detection 322. Feature matching 324 may then establish matching keypoint correspondences between images. Mapping 326 maps the locations of the images to coordinates in the environment and pose graph optimization uses this information to identify relative location information for the agent 104. A pose graph 328 may be generated from the relative location information. Odometry features 329 are generated based on the relative positioning information.

Feature fusion 330 combines the radio-based features and the odometry features 329 to generate absolute location estimate 332. This fusion may employ a cross-attention model to combine the features, which may then be processed by a long-short term memory (LSTM) layer and a fully connected layer to output the absolute location estimate 332.

Figure 4:
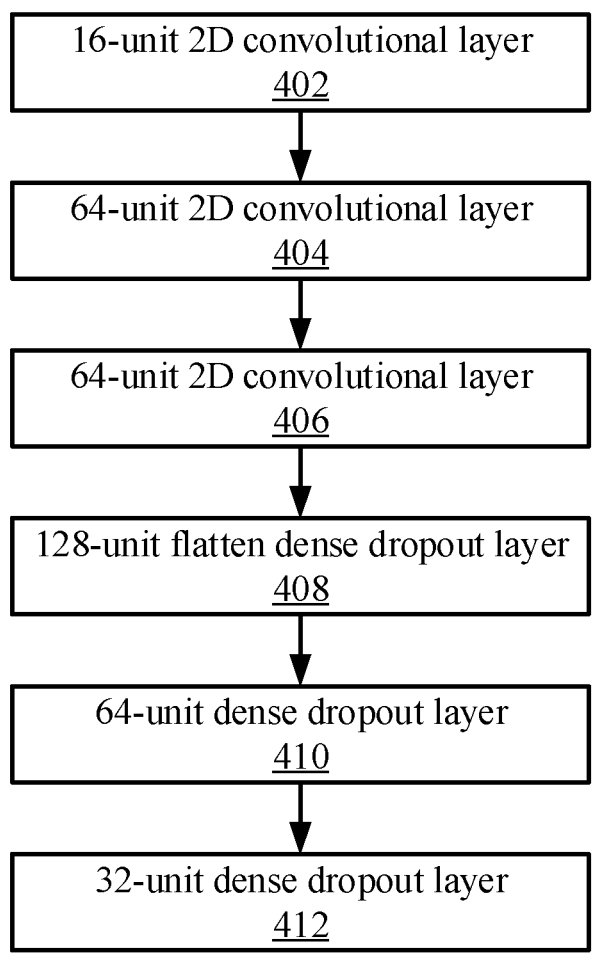
FIG. 4 is a block/flow diagram of a neural network model that can be used to generate radio-based location features, in accordance with an embodiment of the present invention.

Referring now to FIG. 4, an exemplary neural network model is shown for generating the radio-based features 316. The model includes a set of convolutional two-dimensional sections, each including a convolutional layer with leaky rectified linear unit (ReLU) activation functions, a batchnorm layer, and a dropout layer. A first such section 402 has sixteen units and two subsequent sections 404 and 406 each have sixty-four units. A 128-unit flatten dense dropout layer 408 follows, and then a 64-unit dense dropout layer 410 and a 32-unit dense dropout layer 412 further process the output to generate the radio-based features 316.

Figure 5:
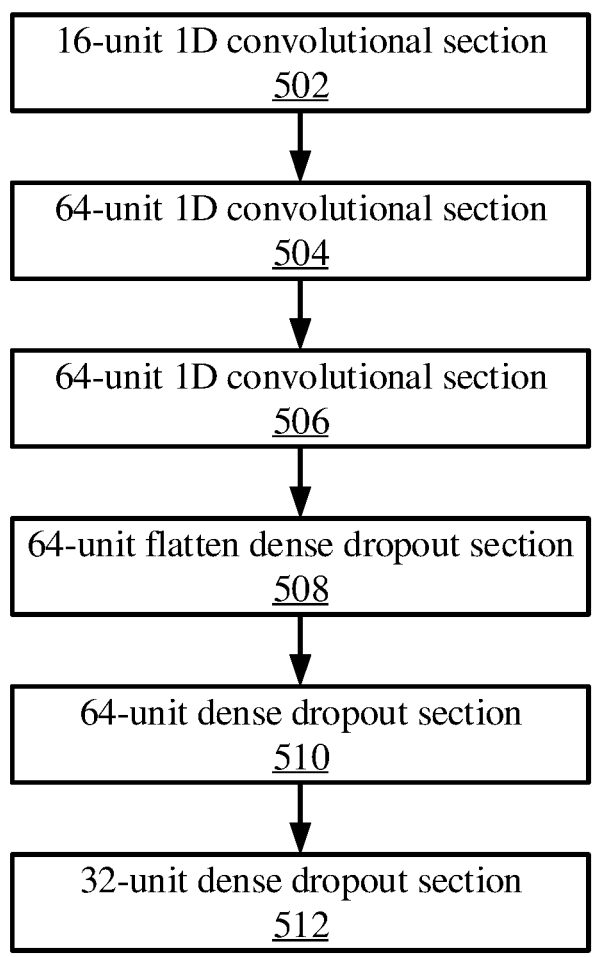
FIG. 5 is a block/flow diagram of a neural network model that can be used to generate odometry based location features, in accordance with an embodiment of the present invention.

Referring now to FIG. 5, an exemplary neural network model is shown for generating the odometry-based features 329. This model starts with a set of convolutional one-dimensional sections, each including a convolutional layer with leaky ReLU activation functions, a batchnorm layer, and a dropout layer. A first such section 502 has sixteen units and two subsequent sections 504 and 506 each have sixty-four units. A 64-unit flatten dense dropout layer 508 follows, and then a 64-unit dense dropout layer 510 and a 32-unit dense dropout layer 512 further process the output to generate the odometry-based features 329.

When the feature fusion model 330 processes the radio-based features 316 and the odometry features 329, it may first prepare the features by passing them through a simple convolutional neural network, so that the location and certainty-related features may be embedded into a more representative feature that captures both location and certainty.

The fusion model 330 may use attention to adaptively weight the features of the respective sensor paths, leveraging their complementary nature. In particular, cross-attention may be used to weight each sensor with respect to one another to extract inter-sensor correlations. The model may weight the radio-based estimates more highly when the odometry-based estimates suffer from unfavorable environmental conditions, and may weight the odometry-based estimates more highly when the radio-based estimates suffer from non-line-of-sight paths to the anchors 106. The cross-attention can further include the benefits of self-attention, incorporating features that correlate with tracking error.

Cross-attention masks $A_{rb}$ and $A_{vr}$ may be jointly learned using the radio-based features 316 ($F_r$) and the odometry-based features 329 ($F_v$). The masks may be defined as:

$$A_{rv} = \sigma[(W_{rv}^Q F_v)^T W_{rv}^\psi F_v]$$

$$A_{vr} = \sigma[(W_{vr}^Q F_r)^T W_{vr}^\psi F_r]$$

where $W^Q$ and $W^\psi$ are the weights learned during training, which transform the extracted features in to embedding spaces Q and ψ respectively, and a is a non-linear activation function. The embedding spaces may be a lower-dimension version of original input features from the radio-based path and the odometry-based path that extracts underlying global topology data. On a high level, meaningful features are captured through local convolutions, while long-term dependencies may be captured through embedding spaces, jointly adapting the masks by capturing cross-correlations between the two sensor types.

After the masks are learned, each mask may be applied to a respective sensor feature in an element-wise fashion, and then the masked features may be merged together by concatenation to provide the fused feature:

$$A = [A_{rv} \odot F_v; A_{vr} \odot F_r]$$

The output of the cross-attention, which may be a single-dimension flattened array, is forwarded to an LSTM network, which may include a two-layer recurrent neural network (RNN), with 64 hidden units per layer, to model the temporal dependency of the fused features. Two fully-connected layers may then output the estimate of the absolute location. The LSTM's ability to access its outputs from earlier points in time (representing prior location estimates) enables it to produce absolute location estimates based on the relative location estimates from odometry alone, whenever the radio-based estimates have large uncertainties.

When the agent 104 is in dim lighting conditions, the attention of the radio-based features may be increased, and the attention of the odometry-based features may be decreased. When the agent 104 does not have enough line-of-sight paths to anchors 106, the attention of the radio-based features may be decreased and the attention of the odometry-based features may be increased. Given the independent and complementary nature of the two sensor paths, as well as their respective environmental artifacts, the cross-attention helps to provide robustness against a variety of different adverse conditions.

The model may be trained on a dataset collected across different indoor environments (e.g., office-buildings, homes, conference centers, etc.) with varying scenery, texture, and lighting conditions. This diverse dataset enables the model to avoid overfitting. During training, the input data may be normalized by subtracting the mean over the dataset. Any appropriate loss function may be used during the training, and the loss function may be minimized to adjust model parameters. Once the model is trained, it can be deployed in any environment, generalizing to environments that were not part of the training dataset.

Figure 6:
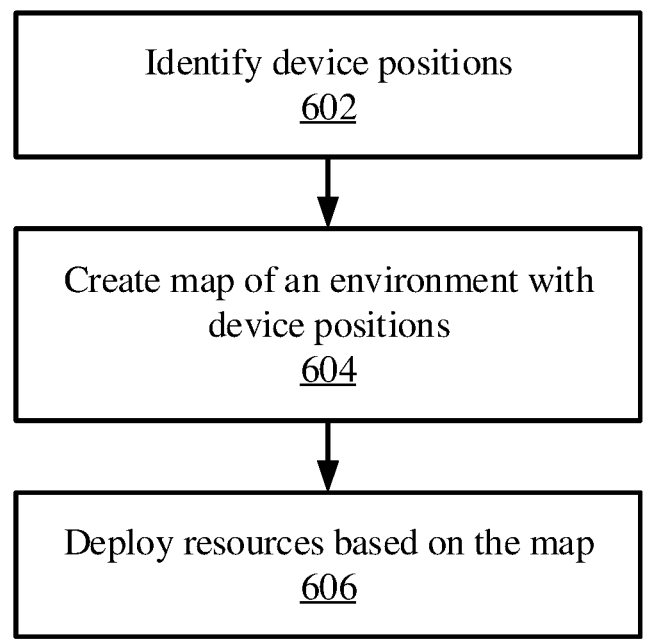
FIG. 6 is a block/flow diagram of a method of deploying resources to an environment using device position information, in accordance with an embodiment of the present invention.

Referring now to FIG. 6, a method of locating and interacting with agents in an environment is shown. Block 602 identifies agent positions within an environment, such as a building interior. The localization of agents may employ a fusion of radio signal ranging, inertial sensor information, and visual odometry. Individual agents 104 may communicate their respective data to a central system that calculates the positions of all of the agents 104.

The central system uses this data to create a map of the environment at block 604. For example, the agent positions may be superimposed on a preexisting map of a building's interior, to identify the location of each such agent. Block 604 may further include creating the map of the building's interior itself, by tracking movements of the devices within the building. For example, tracking the motion of cellphones can help to identify pathways through the building.

Block 606 deploys resources based on the map. The map can be used in a variety of applications. For example, asset tracking may be used to identify inventory and stocking levels within a store, and deploying resources may include restocking items that are running out. Device tracking may further be used for emergency response purposes, to identify the locations of people within the building for rescue in the event of a fire or natural disaster. The mapping may further be used to help responders navigate within the building, following paths that are generated by tracking devices through the building. Other potential applications include tracking workers and assets in construction zones, for example where it may not be possible to implement an infrastructure-based localization system, or tracking workers in large factories, where deploying a dedicated localization system would be cost prohibitive. In the case of an augmented reality system, the map can help to identify when users are close to one another, and deploying resources may include electronically displaying elements of the augmented reality to reflect their positions.

Figure 7:
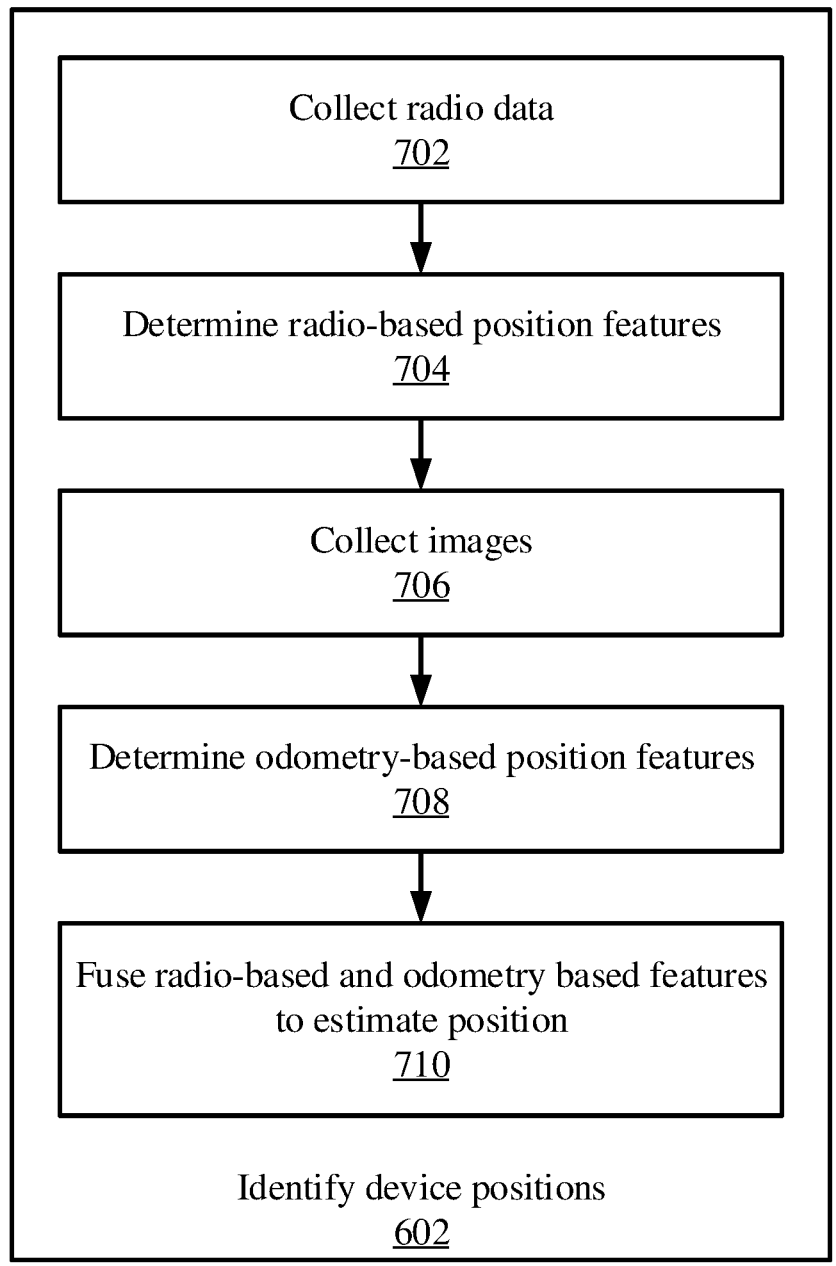
FIG. 7 is a block/flow diagram of a method of identifying device positions using sensor fusion, in accordance with an embodiment of the present invention.
Figure 8:
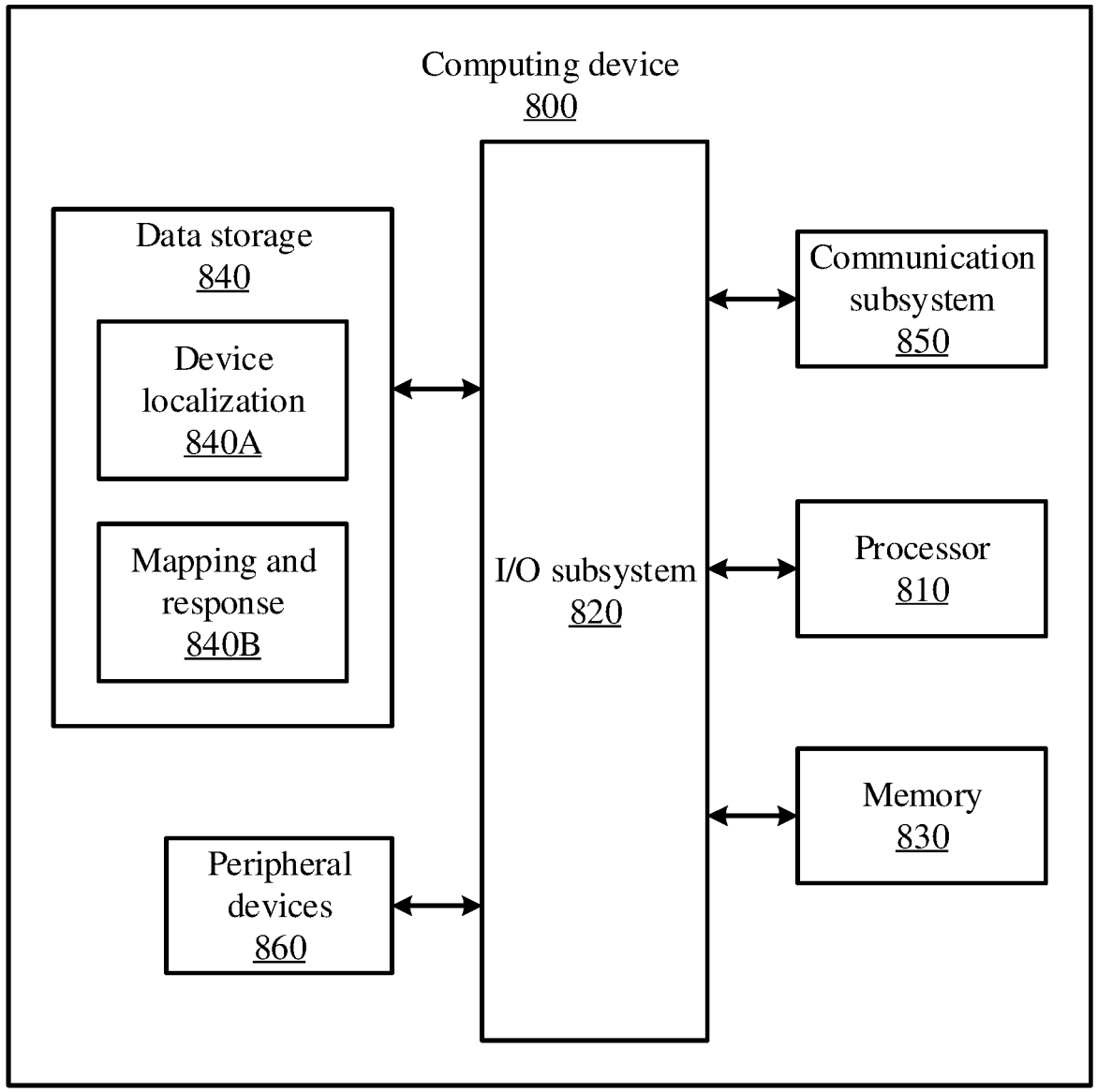
FIG. 8 is a block diagram of a computing device that includes software to perform device localization, mapping, and response functions, in accordance with an embodiment of the present invention.

Referring now to FIG. 7, additional detail on the identification of device positions 602 is shown. Block 702 collects radio data at an agent 104, for example using a UWB transceiver 206. Block 704 then uses the collected radio data to determine radio-based features 316 as described above. Block 706 collects visual information at the agent, for example using camera(s) 210. Block 708 uses the collected visual information to determine odometry-based features 329. Block 710 fuses the radio-based and odometry-based features to provide position estimate that is sensitive to the quality of the sensor data acquitted by the agent 104.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now to FIG. 5, an exemplary computing device 500 is shown, in accordance with an embodiment of the present invention. The computing device 500 is configured to perform classifier enhancement.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for localizing devices within an environment, based on radio ranging information, inertial sensor information, and pressure sensor information, and 640B for mapping a building interior and responding to device positioning. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Figure 9:
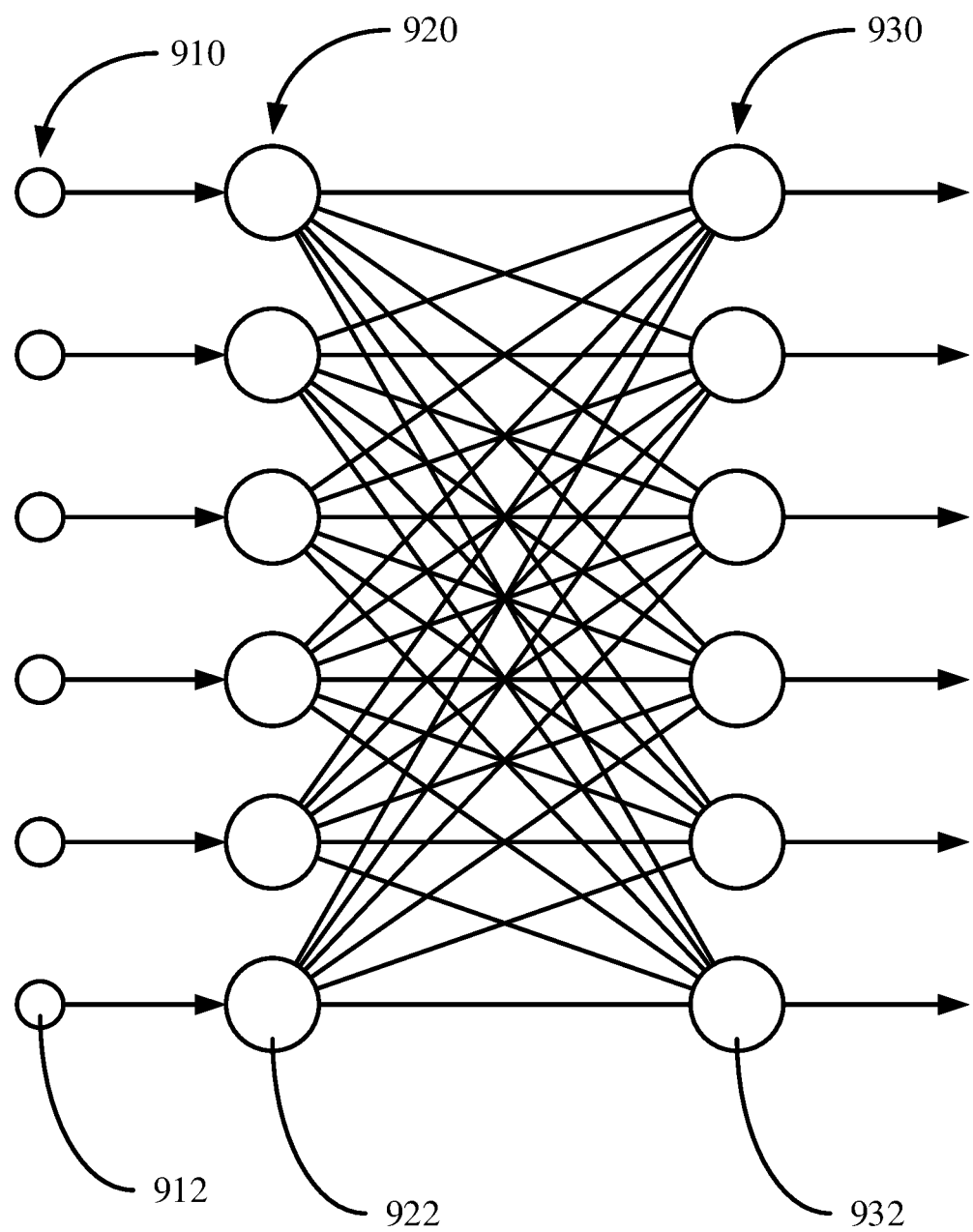
FIG. 9 is a diagram of an exemplary neural network architecture that may be used to implement part of a neural network model, in accordance with an embodiment of the present invention.
Figure 10:
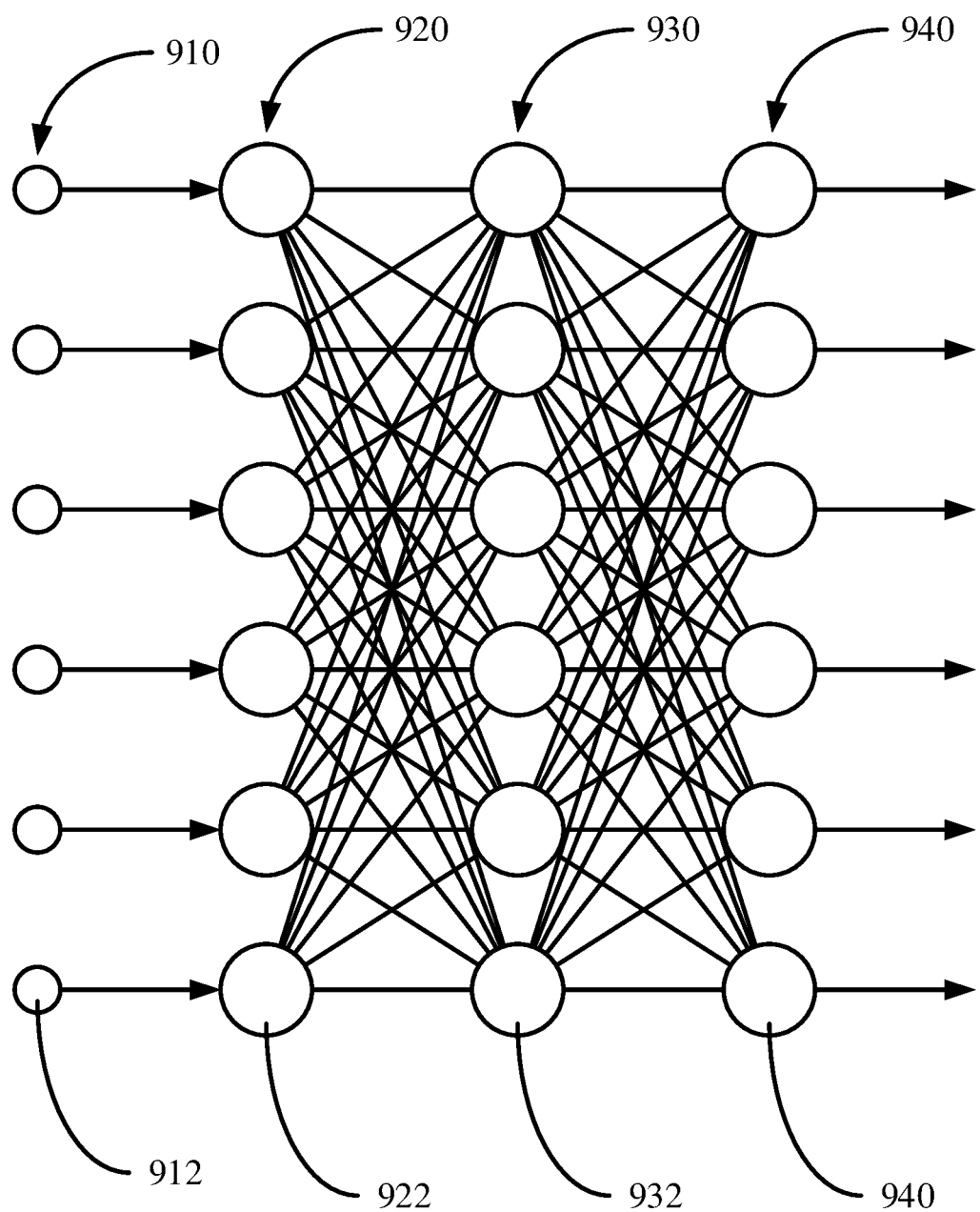
FIG. 10 is a diagram of an exemplary deep neural network architecture that may be used to implement part of a neural network model, in accordance with an embodiment of the present invention.

Referring now to FIGS. 9 and 10, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 920 of source nodes 922, and a single computation layer 930 having one or more computation nodes 932 that also act as output nodes, where there is a single computation node 932 for each possible category into which the input example could be classified. An input layer 920 can have a number of source nodes 922 equal to the number of data values 912 in the input data 910. The data values 912 in the input data 910 can be represented as a column vector. Each computation node 932 in the computation layer 930 generates a linear combination of weighted values from the input data 910 fed into input nodes 920, and applies a non-linear activation function that is differentiable to the sum. The exemplary simple neural network can perform classification on linearly separable examples (e.g., patterns).

A deep neural network, such as a multilayer perceptron, can have an input layer 920 of source nodes 922, one or more computation layer(s) 930 having one or more computation nodes 932, and an output layer 940, where there is a single output node 942 for each possible category into which the input example could be classified. An input layer 920 can have a number of source nodes 922 equal to the number of data values 912 in the input data 910. The computation nodes 932 in the computation layer(s) 930 can also be referred to as hidden layers, because they are between the source nodes 922 and output node(s) 942 and are not directly observed. Each node 932, 942 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 932 in the one or more computation (hidden) layer(s) 930 perform a nonlinear transformation on the input data 912 that generates a feature space. The classes or categories may be more easily separated in the feature space than in the original data space.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for determining a device position, comprising:
   determining a first position estimate using radio-based range information;
   determining a second position estimate using visual odometry information;
   determining an impact of non-line-of-sight paths on the first position estimate;
   fusing the first position estimate and the second position estimate based on radio environmental conditions and visual environmental conditions to determine a final position estimate; and
   deploying resources based on the final position estimate.

2. The method of claim 1, wherein determining the impact of non-line-of-sight paths includes determining a radio signal strength of a plurality of anchor devices.

3. The method of claim 2, wherein determining the impact of non-line-of-sight paths includes determining that fewer than a threshold number of anchor devices have line-of-sight paths.

4. The method of claim 2, wherein fusing the first position and the second position estimate includes processing a vector that is a concatenation of the first position estimate and the radio signal strength of the plurality of anchor devices.

5. The method of claim 1, further comprising determining an impact of environmental conditions on the second position estimate.

6. The method of claim 5, wherein determining the impact of environmental conditions includes determining keypoint matches between image frames.

7. The method of claim 6, wherein determining the impact of environmental conditions includes determining that the number of keypoint matches is below a threshold value.

8. The method of claim 6, wherein fusing the first position and the second position estimate includes processing a vector that is a concatenation of the second position estimate and keypoint matches.

9. The method of claim 1, further comprising determining the radio-based range information using an ultra-wide band transceiver and determining the visual odometry information using a stereo camera.

10. A system for determining a device position, comprising:
    a hardware processor; and
    a memory that stores a computer program, which, when executed by the hardware processor, causes the hardware processor to:
    determine a first position estimate using radio-based range information;
    determine a second position estimate using visual odometry information;
    determine an impact of non-line-of-sight paths on the first position estimate;
    fuse the first position estimate and the second position estimate based on radio environmental conditions and visual environmental conditions to determine a final position estimate; and
    deploy resources based on the final position estimate.

11. The system of claim 10, wherein the computer program further causes the hardware processor to determine a radio signal strength of a plurality of anchor devices.

12. The system of claim 11, wherein the computer program further causes the hardware processor to determine that fewer than a threshold number of anchor devices have line-of-sight paths.

13. The system of claim 11, wherein the computer program further causes the hardware processor to determine process a vector that is a concatenation of the first position estimate and the radio signal strength of the plurality of anchor devices for the fusing of the first position estimate and the second position estimate.

14. The system of claim 10, wherein the computer program further causes the hardware processor to determine an impact of environmental conditions on the second position estimate.

15. The system of claim 14, wherein the computer program further causes the hardware processor to determine keypoint matches between image frames.

16. The system of claim 15, wherein the computer program further causes the hardware processor to determine that the number of keypoint matches is below a threshold value.

17. The system of claim 15, wherein the computer program further causes the hardware processor to process a vector that is a concatenation of the second position estimate and keypoint matches for the fusing of the first position estimate and the second position estimate.

18. The system of claim 10, further comprising an ultra-wide band transceiver configured to capture the radio-based range information and a stereo camera configured to capture the visual odometry information.

19. A computer-implemented method for determining a device position, comprising:
- determining a first position estimate using radio-based range information;
- determining a second position estimate using visual odometry information;
- determining an impact of environmental conditions on the second position estimate by determining keypoint matches between image frames;
- fusing the first position estimate and the second position estimate based on radio environmental conditions and visual environmental conditions to determine a final position estimate, including processing a vector that is a concatenation of the second position estimate and keypoint matches; and
- deploying resources based on the final position estimate.

* * * * *